M. J. SANDERS.
STALL ATTACHMENT.
APPLICATION FILED AUG. 23, 1920.
1,399,659.
Patented Dec. 6, 1921.
2 SHEETS—SHEET 1.
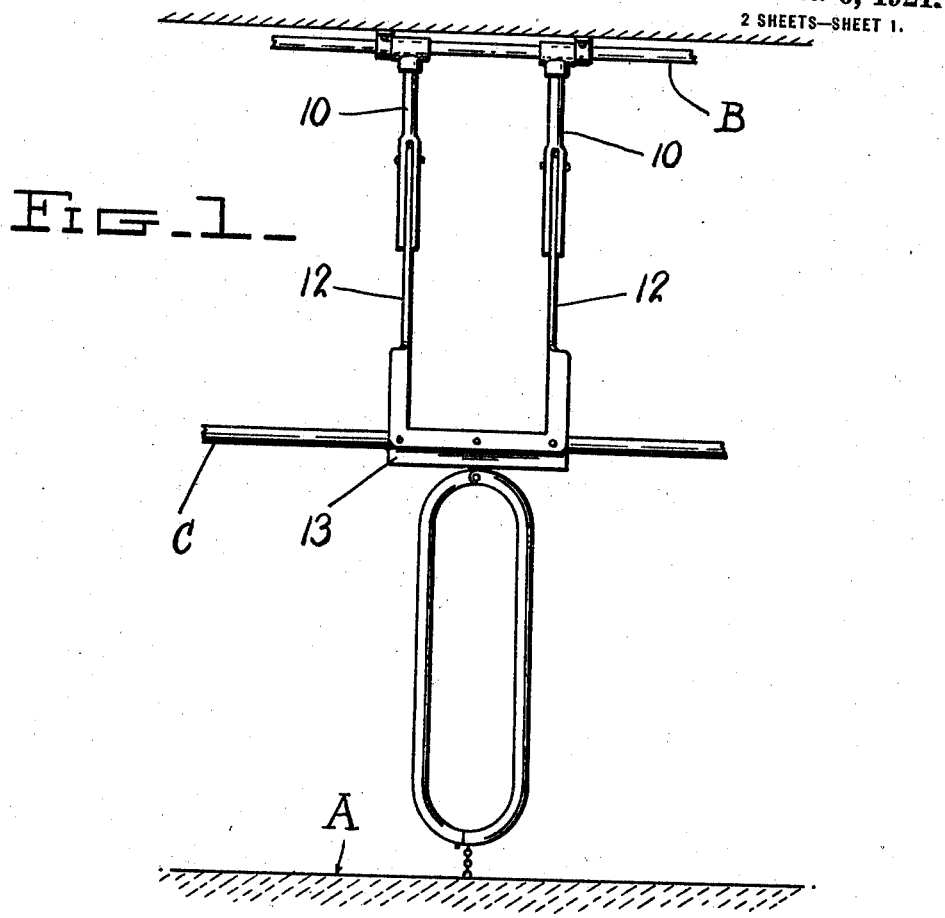
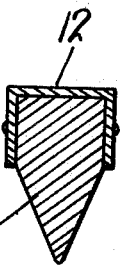
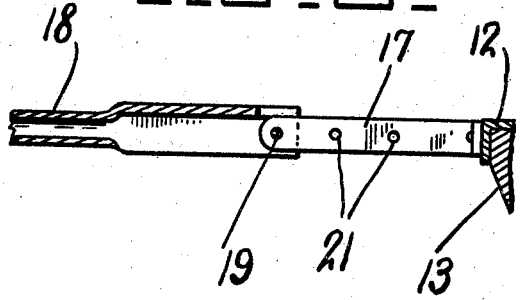
M. J. Sanders, INVENTOR
BY Victor J. Evans, ATTORNEY
WITNESS:

M. J. SANDERS.
STALL ATTACHMENT.
APPLICATION FILED AUG. 23, 1920.
1,399,659.
Patented Dec. 6, 1921.
2 SHEETS—SHEET 2.
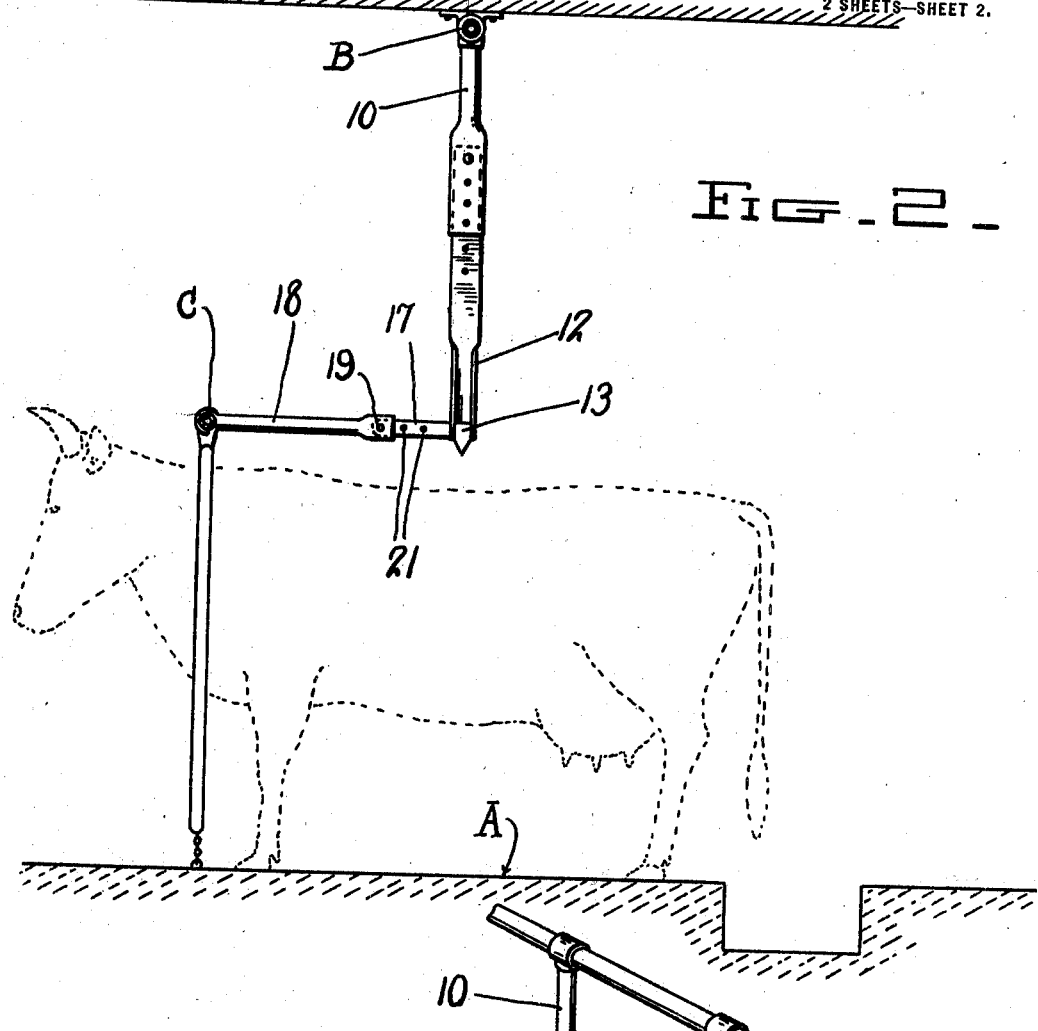
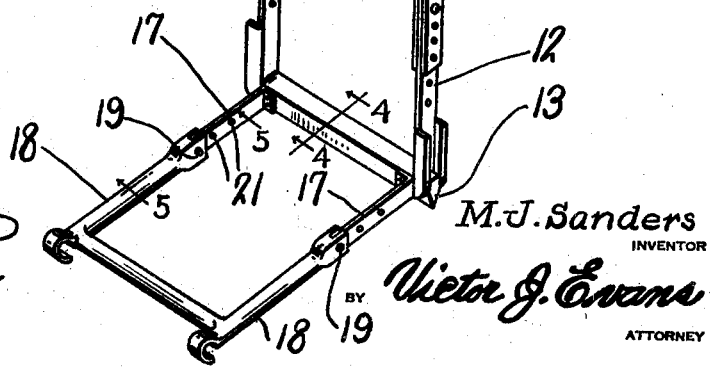

UNITED STATES PATENT OFFICE.

MYRON J. SANDERS, OF MEDIMONT, IDAHO.

STALL ATTACHMENT.

1,399,659.  Specification of Letters Patent.  Patented Dec. 6, 1921.

Application filed August 23, 1920. Serial No. 405,265.

*To all whom it may concern:*

Be it known that I, MYRON J. SANDERS, a citizen of the United States, residing at Medimont, in the county of Kootenai and State of Idaho, have invented new and useful Improvements in Stall Attachments, of which the following is a specification.

This invention comprehends the provision of a stall attachment designed to prevent the animal from crowding forward, when voiding, which practice results in the soiling of the area in which the animal has to stand or lie, the device embodying among other features a horizontally disposed bar having a reasonably sharp edge which is normally spaced from the back of the animal, and which is adapted to contact the latter when the animal arches the back in voiding.

Other objects of importance resides in the provision of a device for the above mentioned purpose, susceptible of adjustment both vertically and horizontally, to accommodate itself to animals of different size.

The nature and advantage of the invention will be better understood when the following detail description is read in connection with the accompanying drawings the invention residing in the construction, combination and arrangement of parts as claimed.

In the drawings forming part of this application like numerals of reference indicate similar parts in the several views and wherein:

Figure 1 is a view in elevation showing a portion of a stall and the attachment in position for use.

Fig. 2 is a side elevation showing the normal position of the attachment with respect to the animal.

Fig. 3 is a perspective view of the attachment removed from the stall.

Fig. 4 is a sectional view taken on line 4—4 of Fig. 3.

Fig. 5 is a similar view taken on line 5—5 of Fig. 3.

Referring to the drawings in detail, A indicates generally a stall, and depending from an overhead support B and secured thereto in any suitable manner are spaced parallel members 10, the corresponding lower extremities of which are associated with a transverse bar 12. This bar may be formed from a single piece of material and formed with a sharp edge portion, that is preferably of U-shaped formation in cross section as shown to accommodate a strip of wood 13 which projects below the bar and tapered as at 14 to provide a sharp edge. As shown in Fig. 2, this bar is normally spaced from the back of the animal, but is disposed relatively thereto so as to contact the back when the animal arches the back in voiding. In order to regulate the height of the bar 12 for different sized animals, the members are made up of adjustable sections, preferably telescopic sections which are held fixed relatively by means of a retaining pin 15 passed through alined openings in the respective sections.

Secured to the transverse bar 12 is a substantially rectangular frame like structure embodying two sections 17 and 18 respectively, the section 17 being associated with the bar 12 while the section 18 is adapted for association with the member C of the stall. These sections 17 and 18 respectively are separable and are connected by pins 19 which are adapted to pass through any of a plurality of openings 21 so that the sections can be moved toward and away from each other to vary the distance of the bar 12 in regard to the member C of the stall. To permit of this adjustment of the bar 12 horizontally, it is of course to be understood that the members 10 are associated with overhead supports B to permit of pivotal or swinging movement of said members. In addition to being adjustable relatively, the section 18 of the frame like structure may also be swung from a horizontal to a vertical position upon the pins 19 as pivoted, so that the section 18 may be arranged in an out-of-the-way position when it is desired to remove the animal from the stall.

In practice, the attachment is arranged in the stall in the manner shown in Figs. 1 and 2 with the bar 12 being spaced a slight distance from the back of the animal. It is a very common practice with animals to crowd forwardly in a stall when voiding, and to arch the back at the same time, with the result that the animal occupies a position in the stall that soils the floor or area in which the animal has to stand or lie. The attachment is capable of adjustment to accommodate itself to animals of different sizes and with the bar 12 positioned with respect to the back of the animal, it contacts the back at the point of the arch, thereby causing the animal to move rearwardly in the stall into proper position with respect to the trough arranged at the outer edge thereof, thus preventing the full area of the stall from being soiled when the animal is voiding. The invention is simple in construction and can be readily and easily applied to a stall without altering the latter.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

1. A stall attachment of the character described comprising spaced parallel vertically disposed bars suspended from a suitable overhead support and associated therewith for swinging movement, a transverse bar carried by lower ends of the before mentioned bars and having a sharp edge, means whereby said bar may be adjusted vertically with respect to the back of the animal, and means connecting said bar with a part of the stall, said means being adjustable to permit of horizontal movement of the bar with respect to the back of the animal for the purpose specified.

2. A stall attachment of the character described, comprising spaced parallel bars suspended from an overhead support for swinging movement, said bars including telescopic sections, means for holding said sections fixed in an adjusted position, a transverse bar carried by one of said sections and having a sharp edge, a frame like structure connecting the latter mentioned sections with a part of the stall, said frame like structure including adjustable sections whereby the said transverse bar may be moved horizontally with respect to the back of the animal, and one of said sections being mounted for pivotal movement as and for the purpose specified.

In testimony whereof I affix my signature.

MYRON J. SANDERS.